United States Patent
Jaeker et al.

(10) Patent No.: US 7,849,667 B2
(45) Date of Patent: Dec. 14, 2010

(54) CABLE DRAG SYSTEM COMPRISING A CABLE DRAG DEVICE AND A RETAINING DEVICE RECEIVING THE SAME

(75) Inventors: Thilo-Alexander Jaeker, Sankt Augustin (DE); Frank Blase, Bergisch Gladbach (DE); Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 318 days.

(21) Appl. No.: 11/911,273

(22) PCT Filed: Apr. 11, 2006

(86) PCT No.: PCT/DE2006/000646

§ 371 (c)(1),
(2), (4) Date: Jun. 18, 2008

(87) PCT Pub. No.: WO2006/108401

PCT Pub. Date: Oct. 19, 2006

(65) Prior Publication Data

US 2010/0175363 A1 Jul. 15, 2010

(30) Foreign Application Priority Data

Apr. 11, 2005 (DE) .................. 20 2005 005 826 U (51) Int. Cl.
*F16G 13/16* (2006.01)

(52) U.S. Cl. .............................. 59/78.1; 59/900; 248/49

(58) Field of Classification Search ...................... 59/78, 59/78.1, 700, 9; 248/49, 51
See application file for complete search history.

(56) References Cited

U.S. PATENT DOCUMENTS 4,129,277 A 12/1978 Tenniswood 5,038,556 A 8/1991 Moritz et al.
5,771,676 A * 6/1998 Komiya et al. ................ 59/78.1

(Continued)

FOREIGN PATENT DOCUMENTS

CA 2225279 7/2001

(Continued)

OTHER PUBLICATIONS

German Search Report issued in German Patent Application No. 202005005826.2 dated May 15, 2006.

(Continued)

*Primary Examiner*—David B Jones
(74) *Attorney, Agent, or Firm*—Grossman Tucker Perrealt & Pfleger, PLLC (57) ABSTRACT

The invention relates to a cable drag device (1) for guiding power supply cables. Said cable drag device is constituted of a plurality of members (2) that are hinged to each other and that comprise two respective side bars (3) inter-linked by a cross connection. The aim of the invention is to provide a cable drag device (1) whose upper strand is suitably supported in a suitable retaining device for the upper strand. For this purpose, the side bars (3) of at least some members (2) comprise supporting elements (9) that project outward beyond the remaining areas of the outer face (10) of the respective side bar (3) when having a substantially linear relative position to an adjacent member. These supporting elements do not project outward beyond the remaining areas of the outer face (10) of the respective side bar (3) when offset relative to the adjacent member. An adjusting device (11) provided on the adjacent member effects the aforementioned positioning of the supporting elements (9) depending on the relative position of the members.

23 Claims, 3 Drawing Sheets

U.S. PATENT DOCUMENTS

| | | |
|---|---|---|
| 6,215,068 B1 | 4/2001 | Meier |
| 6,615,573 B2 | 9/2003 | Blase |
| 6,745,555 B2 | 6/2004 | Hermey et al. |
| 6,992,254 B2 * | 1/2006 | Komiya .................. 248/51 |
| 2005/0040275 A1 | 2/2005 | Komiya |

FOREIGN PATENT DOCUMENTS

| | | |
|---|---|---|
| DE | 29607171 | 6/1996 |
| DE | 29706670 | 6/1997 |
| DE | 2971144 | 4/1999 |
| DE | 29802278 | 6/1999 |
| DE | 20001505 | 5/2000 |
| DE | 102004038817 | 3/2005 |
| EP | 0384153 | 1/1990 |
| EP | 0490022 | 6/1992 |
| EP | 0919743 A1 | 6/1999 |
| EP | 1201963 | 10/2001 |
| WO | WO97/40289 | 10/1997 |
| WO | WO02/086349 | 10/2002 |

OTHER PUBLICATIONS

International Search Report dated Jan. 8, 2006 in corresponding PCT Application No. PCT/DE06/00646, 3 pgs.

* cited by examiner

CABLE DRAG SYSTEM COMPRISING A CABLE DRAG DEVICE AND A RETAINING DEVICE RECEIVING THE SAME

The invention relates to a cable drag device for guiding energy lines, comprising a plurality of members connected to each other in pivoting fashion, each of which displays two side bars connected to each other by a cross-connection, where the cable drag device can be moved back and forth, forming a lower strand, a deflection zone following on therefrom, and an upper strand following on from the deflection zone, in the longitudinal direction of the strands, and the members can in this context be pivoted out of an essentially linear arrangement in the strands into an angled relative position in the deflection zone, and from this position back into an essentially linear arrangement. The invention furthermore relates to a system comprising a cable drag device and a retaining device for the upper strand of the cable drag device.

The lower strand of such a cable drag device is deposited or guided with the help of guide troughs, various designs of which are known, or, in the event of relatively short travel paths, by simply being deposited on a flat base. In the event of relatively short travel paths, the upper strand can be designed as a self-supporting upper strand. In the event of longer travel paths, the upper strand has to be supported owing to its weight.

If the upper strand is connected to a moving connection, such that it moves back and forth, it is deposited on the lower strand in the case of relatively long cable drag devices, and slides on it when said lower strand displays a sufficient length in the respective traveling position of the cable drag device. Beyond the lower strand, and in extension thereof, sliding rails can be positioned at the height of the lower strand, on which the upper strand extending beyond the lower strand can slide. However, there are cases where, following on from the deflection zone, the upper strand is to be arranged to travel in linear fashion at the same height. In these cases, the upper strand moving back and forth has to be supported.

In particular, support of the upper strand is necessary if it is arranged in stationary fashion over a substantial length, and the lower strand is connected to a moving connection and can thus be moved back and forth. In this case, it is not possible to use stationary supporting rails in continuation of the lower strand, on which the underside of the upper strand is supported.

It is therefore desirable to design a cable drag device of the aforementioned type in such a way that it permits suitable support of its upper strand in a suitable retaining device for the upper strand.

A cable drag device for guiding energy lines that consists of a flexible ribbon cable is known from EP 0 490 022 A1. On its sides, the ribbon cable displays sliding elements, spaced apart in the longitudinal direction, that are mounted in locating sleeves and spring-loaded. A lower channel for the lower strand, an upper channel for the upper strand, and a narrower deflection channel for the deflection zone of the ribbon cable are provided for guiding the ribbon cable. Since the deflection zone has to move when the ribbon cable travels, the deflection channel is mounted in the channels for the lower and upper strands in sliding fashion with the help of sliding blocks.

When in the narrower deflection channel, the sliding elements are pressed into the locating sleeves against the spring tension, whereas the spring tension causes them to project from the locating sleeves when in the channels for the lower and upper strands. When, for example, the upper strand of the ribbon cable is moved away from the deflection zone, the sliding elements located on the lower strand are pressed into the locating sleeves by a ramp forming the transition area to the narrower deflection channel. The sliding elements leaving the deflection channel are likewise guided over a ramp into the wider channel for the upper strand of the ribbon cable, such that they emerge from the locating sleeves as a result of the spring tension. They then make contact with an inward-facing wall area of the channel, sliding on this area. In this way, the upper strand is supported when in its straight position.

A disadvantage of this solution envisaged for a ribbon cable is that, owing to the spring tension, the sliding elements lie against the side walls of the deflection channel under pressure. Due to friction, this pressure impedes traversing of the ribbon cable in the retaining device and leads to wear on the sliding elements, such that they have to be replaced after a certain period of service in order to guarantee the supporting function. Moreover, it is relatively complicated to use a deflection channel that is adapted to the deflection zone of the ribbon cable and mounted in the channels for the lower and upper strands in sliding fashion with the help of sliding blocks.

The object of the present invention is therefore to provide a cable drag device that permits relatively simple and low-wear guidance of the same in a retaining device.

According to the invention, the object is solved in that, on a cable drag device of the kind mentioned in the opening paragraph, the side bars of at least some of the members display supporting elements that project outwards beyond the remaining areas of the outer face of the side bar in question when in an essentially linear position relative to an adjacent member, and do not project outwards beyond the remaining areas of the outer face of the side bar in question when in an angled position relative to the adjacent member, where an adjusting device is provided on the adjacent member that effects the aforementioned positioning of the supporting elements as a causal function of the relative position of the members.

Owing to the design of the cable drag device according to the invention, the upper strand can be deposited, and guided where appropriate, in a channel with inwardly-projecting wall areas, on which the supporting elements are supported. When, during traversing of the cable drag device, the members move from the upper strand into the deflection zone, such that they assume an angled position relative to an adjacent member, the measure according to the invention results in the supporting elements, which project beyond the outer faces of the side bars in said channel, being moved into a position in which they do not project beyond the outer faces of the side bars. The members can thus pass through the constriction formed by the inwardly-projecting wall areas of the retaining device and enter the deflection zone without being exposed to friction caused by the wall areas of the retaining device.

Furthermore, the design according to the invention avoids a deflection channel for the deflection zone of the cable drag device that slides longitudinally relative to said channel.

The cable drag device can consist of members connected to each other in pivoting fashion in the conventional manner. Pivotability can be realized by means of pivoting axes on the members, which can be formed by pivot pins and pivot holes, for example. On the other hand, the members can also be connected to each other by connecting elements enabling pivoting connection, or by means of an element extending continuously through the cable drag device in the longitudinal direction. If the members are designed as chain links connected to each other in articulated fashion by means of pivoting axes, the opposite side bars of at least some of the chain links display cross-pieces for holding the links together in stable fashion.

In a preferred development of the invention, the supporting elements are provided with supporting edges, running in the longitudinal direction of the members and facing in the direction of pivoting, that project outwards when the member in question is in an essentially linear position relative to the adjacent member. The supporting edges are then supported on the inwardly-projecting wall areas of the channel for the upper strand of the cable drag device.

In an advantageous embodiment of the invention, the members are designed in such a way that the side bars of two adjacent members overlap, where the bar segments forming the overlapping area are located on the outside on one of the members and on the inside on the other member, and the supporting elements form areas of the outer bar segments that can be laterally extended outwards, and the adjusting devices are located on the outer face of the inner bar segments. This design permits simple interaction of the adjusting devices on the inner bar segments with the supporting elements on the outer bar segments in the overlapping area of the members.

The adjusting device is expediently designed as an outward-facing projection, where the supporting element, as an area of the outer bar segment, and the projection on the inner bar segment are arranged in such a way that, when the members are pivoted into the essentially linear relative position, the projection can be guided under the supporting element, extending it outwards in the process.

The supporting element can be designed as an outwardly bendable area of the outer bar segment.

Furthermore, the projection can display a run-up surface for its unimpeded guidance under the supporting element.

Alternatively or additionally, the supporting element can also be provided with a run-up surface for the projection.

In a preferred development of the invention, the supporting element forms a strip-like edge area of the outer bar segment, which is connected to the remaining area of the outer bar segment at one end, otherwise being separated from it by a slit, and displays the supporting edge at the other end.

The strip-like edge area forming the supporting element can, like the remaining edge area of the outer bar segment facing the adjacent side bar, be curved in the manner of a reference circle in the bar plane.

In this context, the end of the strip-like edge area forming the supporting edge can lie in the center longitudinal axis of the side bar.

Furthermore, the end of the strip-like edge area connected to the remaining area of the outer bar segment can be located in the radius of the reference circle running perpendicularly to the center longitudinal axis of the side bar.

In such a design of the supporting element, the projection is preferably designed as a strip that is curved in the manner of a reference circle and has a run-up surface rising towards the center longitudinal axis of the side bar.

Furthermore, the edge area of the outer bar segment following on from the supporting edge of the strip-like edge area forming the supporting element can, on its inner face, display a recess open towards the supporting edge. In this context, the side wall of the recess facing away from the supporting edge forms a stop face for the projection to limit the pivoting of adjacent members into the angled position.

Moreover, further stop faces can be located on the inner bars, interacting with stops on the inner face of the outer bar segments to limit the pivoting of adjacent members into the essentially linear arrangement and/or the angled position.

The members can display cranked side bars with inwardly cranked bar segments and outwardly cranked bar segments. In this context, the supporting elements can be located on the outwardly cranked bar segments, and the adjusting devices on the inwardly cranked bar segments.

In an alternative embodiment, the members alternately display side bars located on the outside and the inside. In this case, the supporting elements can be located on the outer side bars, and the adjusting devices on the inner side bars.

The supporting elements can be manufactured in one piece with the side bars, using a material suitable for this purpose, e.g. plastic material. On the other hand, the supporting elements can also be manufactured from a material other than that of the side bars that displays particularly favorable material properties for their supporting and, where appropriate, sliding function, especially wear resistance and a favorable coefficient of friction in relation to the material of the retaining device. In particular, the supporting elements can be manufactured with the side bars by two-component injection molding in a single mold, or by injection molding the supporting elements onto the previously manufactured side bars.

The object on which the invention is based is further solved by a system comprising a cable drag device with the design features described above and a retaining device for the upper strand of the cable drag device, where the retaining device displays a channel, extending in the longitudinal direction of the upper strand, having a first area whose width corresponds, with slight play, to the width of the members with non-extended supporting elements, and a second area located above it that is widened in stepped fashion and whose width corresponds at least to the width of the members with outwardly extended supporting elements, such that the supporting elements are supported on the step of the wider area on both sides of the members.

In a preferred development, the retaining device also receives the lower strand of the cable drag device in a channel that extends in the longitudinal direction of the lower strand and displays lower, inward-facing wall areas, on which the members of the lower strand are supported, at least on lateral areas of their underside, and a width corresponding at least to the width of the members with outwardly extended supporting elements.

The retaining device can be designed as a trough, into which the upper channel for the upper strand and the lower channel for the lower strand are integrated, where the first area of the upper channel extends up to the lower channel, and the lower channel is widened in stepped fashion compared to the first area.

The trough is preferably designed as a one-piece section, e.g. an extruded aluminum section.

In a further preferred embodiment, the retaining device displays, on its upper or lower narrow face, an opening extending in the longitudinal direction for passing through a catch for the moving connecting element of the cable drag device, which is connected either to a lower strand of the cable drag device that can be moved back and forth, or to an upper strand of the cable drag device that can be moved back and forth.

Alternatively, an opening extending in the longitudinal direction for passing through the catch can also be located at an appropriate point in a side wall of the retaining device.

Furthermore, the retaining device can display, on one of its narrow faces opposite the narrow face displaying the opening (if provided), a fastening element, by means of which the retaining device can be fastened on a surface of the overall structure running laterally to it and/or a surface running perpendicularly thereto.

In a preferred embodiment, the second area of the channel for the upper strand displays a width which, with slight play, corresponds to the width of the members with outwardly extended supporting elements.

Moreover, the channel for the lower strand can likewise display a width which, with slight play, corresponds to the width of the members with outwardly extended supporting elements.

The height of the second area of the channel for the upper strand displays at least the height of the members above the supporting edge of the supporting elements. The corresponding area of the channel for the lower strand likewise displays such a height. The two channels must be arranged a distance apart, said distance corresponding to at least the diameter of the arc-shaped deflection zone of the cable drag device. The distance between the two channels and the diameter of the deflection zone are preferably essentially equal.

A practical example of the invention is described in more detail below on the basis of the drawings. The Figures show the following:

FIG. 2a: a side view of the member shown in FIG. 1a,

FIG. 3a: a top view in the direction of arrow A in FIG. 2a,

The considered cable drag device 1, shown in FIGS. 6 to 9, for guiding energy lines not shown in the drawings, comprises a plurality of members 2 connected to each other in pivoting fashion, as illustrated in FIGS. 1a to 5b.

As apparent from these Figures, members 2 each display two opposite side bars 3, these being connected to each other by an upper and a lower cross-piece 4 and 5.

Figure 6:
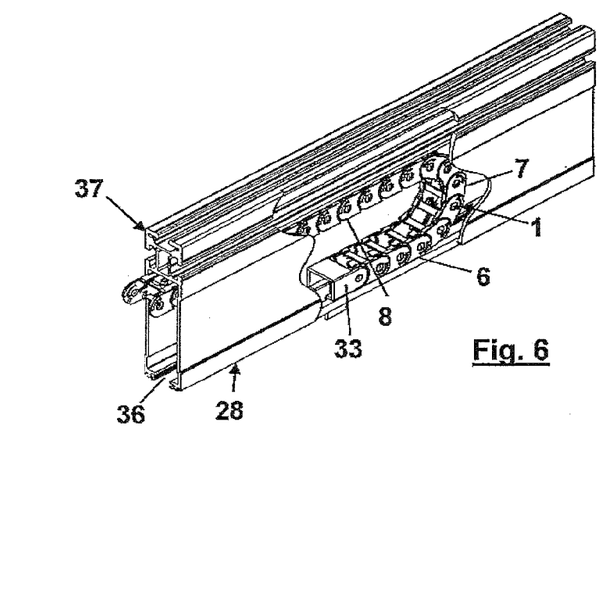
FIG. 6: a perspective view of a system comprising a cable drag device with the members shown in FIGS. 1a to 5b and a retaining device.
Figure 7:
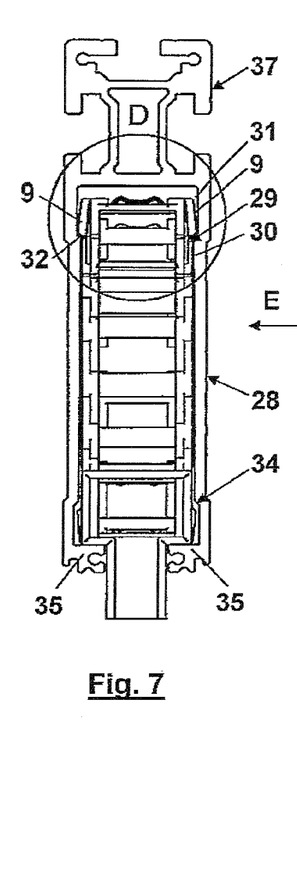
FIG. 7: a face-end view of the system shown in FIG. 6 from the left.
Figure 8:
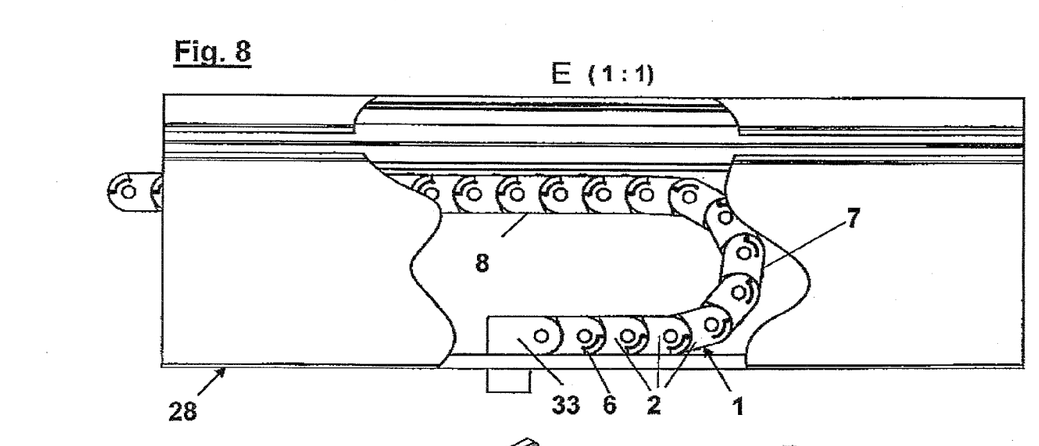
FIG. 8: a side view of the system shown in FIG. 6, and FIG. 9: an enlarged view of the area marked D in FIG. 7.
Figure 9:
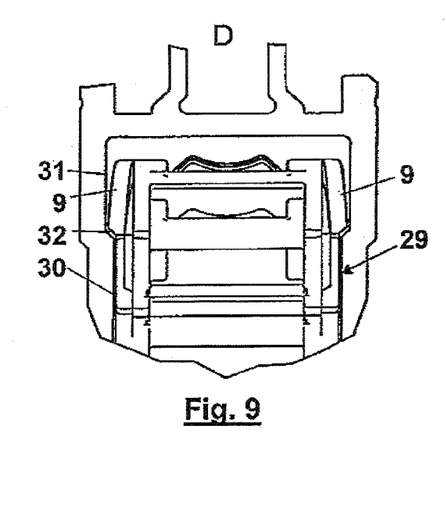

As apparent from FIGS. 6 to 8, in particular, cable drag device 1 can be moved back and forth, forming a lower strand 6, a deflection zone 7 following on therefrom, and an upper strand 8 following on from deflection zone 7, in the longitudinal direction of the strands. In this context, members 2 can be pivoted out of an essentially linear arrangement in strands 6 and 8 into an angled relative position in deflection zone 7, and from this position back into the essentially linear arrangement.

To support upper strand 8 when members 2 are in a position a distance from, and parallel to, lower strand 6, which position is explained in more detail below, side bars 3 of members 2 display supporting elements 9 that project outwards beyond the remaining areas of outer face 10 of side bar 3 in question when in an essentially linear position relative to an adjacent member, and do not project outwards beyond the remaining areas of outer face 10 of the side bar in question when in an angled position relative to the adjacent member. This different positioning of supporting elements 9 of the member in question is effected by adjusting devices 11 on the adjacent member as a causal function of the position of the members relative to each other, as described in more detail below.

FIGS. 1a to 5a show a member 2, on which supporting elements 9 are not extended outwards by the adjusting device of the adjacent member, whereas FIGS. 1b to 5b show this member 2 with supporting elements 9 extended outwards by the adjusting device of the adjacent member.

As apparent from FIGS. 1a to 5b, members 2 of cable drag device 1 considered here are designed in such a way that side bars 3 of two adjacent members overlap, where the bar segments forming the overlapping area are located on the outside on one of the members 2 and on the inside on the other member. Supporting elements 9 form areas of outer bar segments 12 that can be laterally extended outwards, while adjusting devices 11 are located on the outer face of inner bar segments 13.

As shown in FIGS. 1a to 5b, adjusting device 11 is designed as an outward-facing projection, where supporting element 9, as an area of outer bar segment 12, and the projection on inner bar segment 13 are arranged in such a way that, when the members are pivoted into the essentially linear relative position, the projection, i.e. adjusting device 11, can be guided under supporting element 9, extending it outwards in the process.

Figure 1A:
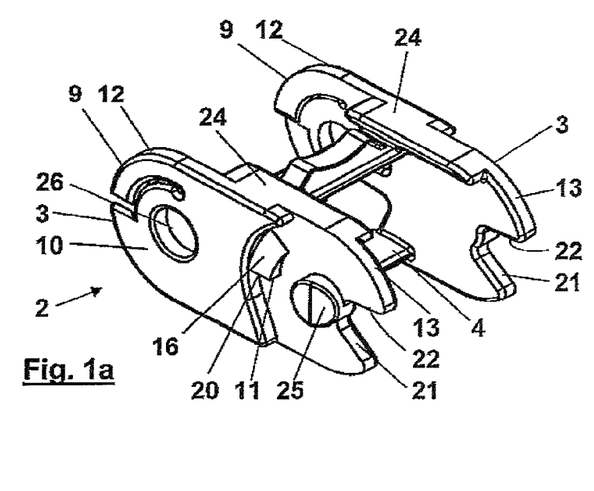
FIG. 1a: a perspective view of a member of the cable drag device.
Figure 1B:
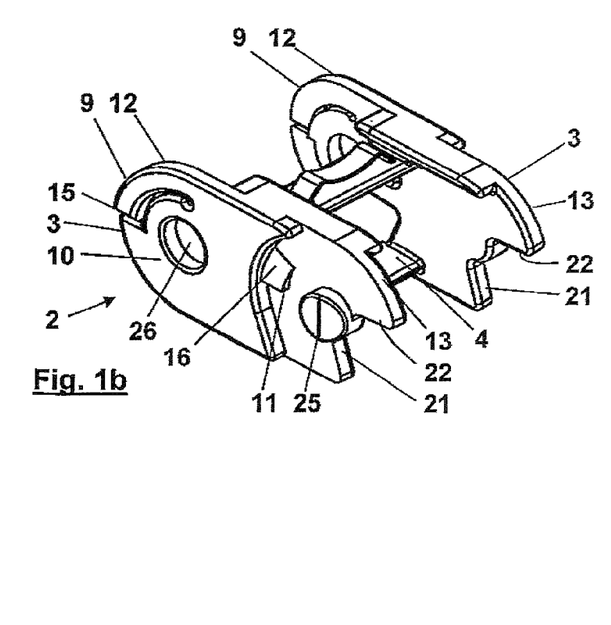
FIG. 1b: a perspective view of the member shown in FIG. 1a, with outwardly extended supporting elements.
Figure 2A:
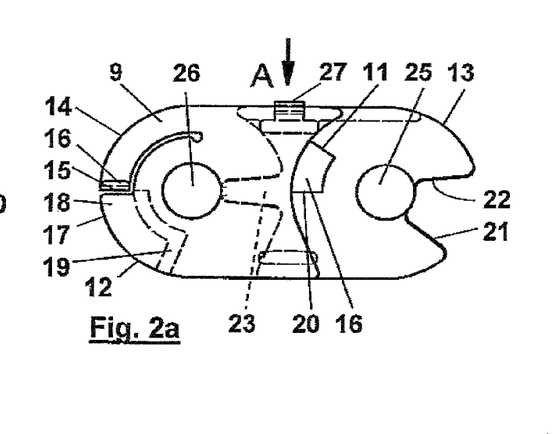

As apparent particularly from FIGS. 1a and 2a, as well as 1b and 2b, the supporting element forms a strip-like edge area 14 of outer bar segment 12 that is curved in the manner of a reference circle in the bar plane. Edge area 14 is connected to the remaining area of outer bar segment 12 at one end, otherwise being separated from it by a slit. It displays a supporting edge 15 at the other end. Supporting edge 15 can display a gentle, outward-facing slope 16 and a gentle, inward-facing slope.

The curvature of the edge area forming supporting element 9 corresponds to the remaining edge area of outer bar segment 12 facing towards the adjacent side bar.

The end of the strip-like edge area forming supporting edge 15 lies in the center longitudinal axis of side bar 3, while the other end of the strip-like edge area, connected to the remaining area of outer bar segment 12, is located roughly in the radius of the reference circle running perpendicularly to the center longitudinal axis of side bar 3.

The projection serving as adjusting device 11 is likewise designed as a strip that is curved in the manner of a reference circle and has a run-up surface 16 rising towards the center longitudinal axis of the side bar.

As apparent from FIGS. 1a and 1b in particular, members 2 display cranked side bars 3 with inwardly cranked bar segments 13 and outwardly cranked bar segments 12. The projections provided with run-up surface 16, i.e. adjusting devices 11, are located on the outer face of inwardly cranked bar segment 13, on the step-like transition to outwardly cranked bar segment 12. As can likewise be taken from FIGS. 2a and 2b, edge area 17 of outer bar segment 12 following on from supporting edge 15 of the strip-like edge area forming supporting element 9 displays, on its inner face, a recess 18 open towards supporting edge 15. Side wall 19 of recess 18 facing away from supporting edge 15 forms a stop face for the projection, i.e. adjusting device 11, to limit the pivoting of adjacent members into the angled position. Side wall 20 of the projection, which includes the highest line of run-up surface 16, interacts with side wall 19 of recess 18.

Figure 2B:
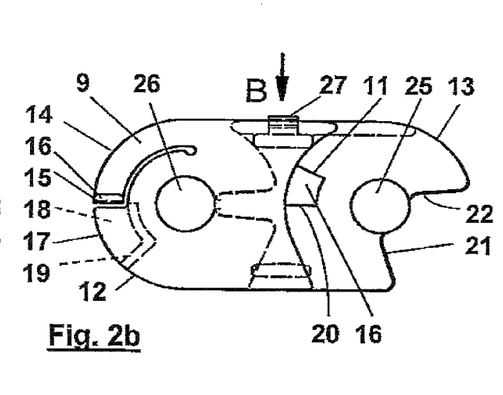
FIG. 2b: a side view of the member shown in FIG. 1b, FIG. 3b: a top view in the direction of arrow B in FIG. 2b, FIG. 4b: a face-end view of the member shown in FIG. 2b from the left.
Figure 3A:
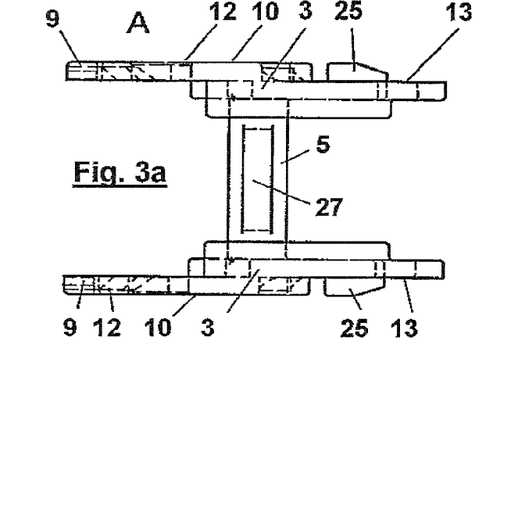
Figure 3B:
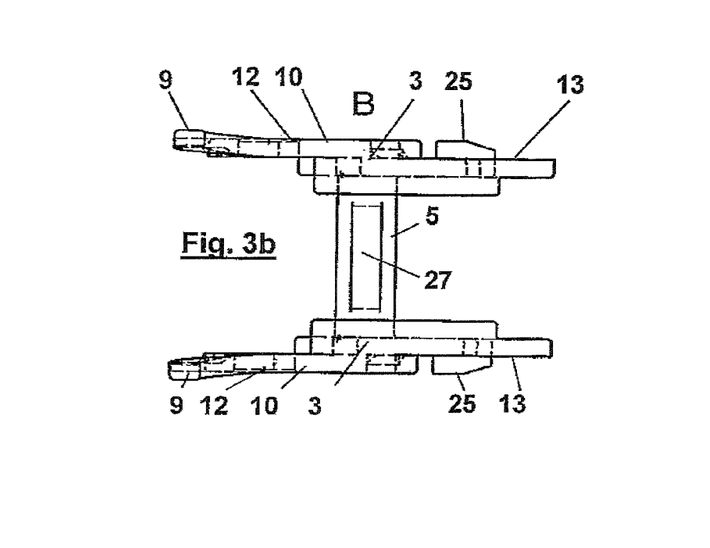
Figure 4A:
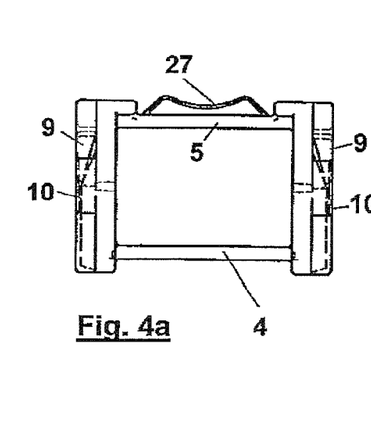
FIG. 4a: a face-end view of the member shown in FIG. 2a from the left.
Figure 4B:
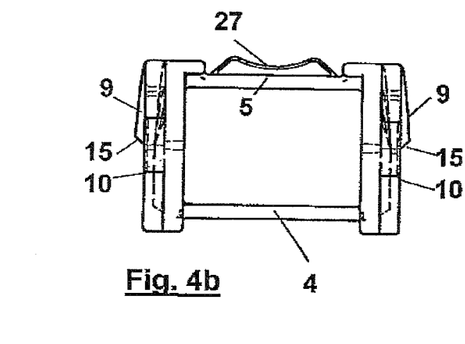

Moreover, stop faces 21 and 22 are located on inner bar segments 13, interacting with stops 23 on the inner face of outer bar segments 12 to limit the pivoting of adjacent members into the essentially linear arrangement or the angled position.

As apparent from FIG. 1a, for example, side bars 3 of members 2 display integrated skids 24 to reduce wear and noise when lower strand 6 is deposited, and possibly slides, in a guide device. Skids 24 can be manufactured in one piece with side bar 3. They can also consist of a different plastic material with special wear-resistant and noise-damping material properties, and be molded onto side bars 3. In particular, skids 24 and side bars 3 can be manufactured by two-component injection molding in a single mold.

Figure 5A:
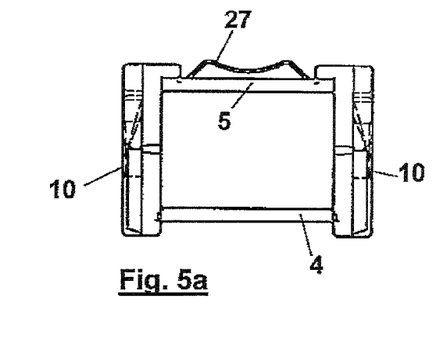
FIG. 5a: a face-end view of the member shown in FIG. 2a from the right.
Figure 5B:
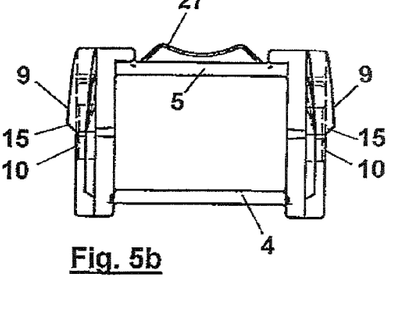
FIG. 5b: a face-end view of the member shown in FIG. 2b from the right.

The members shown in FIGS. 1a and 5b are characterized by a lightweight and simple design. The pivoting connections between adjacent members 2 are formed by pivot pins 25 and pivot holes 26. The two side bars 3 are connected to each other in one piece by lower cross-piece 4. The upper cross-piece can likewise form a one-piece cross-connection. Alternatively, it can be openable in the customary manner, or interrupted for easy insertion of the cables.

For additional security against disconnection of the pivoting connection, pivot pins 25 and pivot holes 26 can display a releasable snap-in connection.

In the practical example of a member 2 shown in FIGS. 1a to 5a, upper cross-piece 5 furthermore displays an elastic spring element 27, which projects beyond the upper side of side bar 3. Spring element 27 serves as a damping element when depositing members 2 as they emerge from deflection zone 7 into lower strand 6.

FIGS. 6 to 9 show how cable drag device 1, comprising members 2 described above, is deposited and guided in a suitable retaining device 28. As apparent from the Figures, retaining device 28 displays a channel 29, extending in the longitudinal direction of upper strand 8 of cable drag device 1, having a first area 30 whose width corresponds, with slight play, to the width of the members with non-extended supporting elements 9, and a second area 31 located above it that is widened in stepped fashion and whose width likewise corresponds, with slight play, to the width of members 2 with extended supporting elements 9. Outwardly extended supporting elements 9 are supported on the step 32 of the wider area on both sides of members 2.

In the system shown in FIGS. 6 to 9, comprising a cable drag device 1 and a retaining device 28, upper strand 8 is connected to a stationary connection not shown in the drawing, while lower strand 6 is connecting to a moving connection 33. If lower strand 6 is moved away from deflection zone 7 via moving connection 33, members 2 of upper strand 8 following on from deflection zone 7 pivot into deflection zone 7. During pivoting of these members 2 into the angled position relative to the adjacent members, adjusting devices 11 are pivoted out of the areas of supporting elements 9, such that supporting elements 9 move back into the non-extended position owing to their elastic restoring force. As a result, members 2 can move out of the wider second area 31 and into the narrower first area 30 of channel 29 for upper strand 8.

Conversely, during the movement described above, members 2 of the deflection zone adjacent to lower strand 6 enter a channel 34 of retaining device 28 that extends in the longitudinal direction of lower strand 6. Since members 2 are pivoted out of the angled position and into the essentially linear arrangement in the process, supporting elements 9 are extended outwards along run-up surface 16 of adjusting device 11, such that they project beyond lateral outer faces 10 of the side bars. For this reason, channel 34 for lower strand 6 is designed with a width corresponding, with slight play, to the width of members 2 with outwardly extended supporting elements 9.

Channel 34, receiving lower strand 6, is provided with lower, inward-facing wall areas 35, on which members 2 of lower strand 6 are supported on lateral areas of their underside.

As apparent from FIGS. 6 to 9, retaining device 28 is designed as a section, e.g. as an extruded aluminum section, into which upper channel 29 for upper strand 8 and lower channel 34 for lower strand 6 are integrated. In this context, first area 30 of upper channel 29 extends up to lower channel 34, such that lower channel 34 is widened in stepped fashion compared to first area 30.

For passing through the cables and connecting a catch to moving connection 33, the lower narrow face of retaining device 28 displays an opening 36, extending between wall areas 35 over their entire length.

On the narrow face opposite opening 36, retaining device 28 displays a fastening element 37, by means of which retaining device 28 can be fastened, on both sides, on a surface of the overall structure (not shown in the drawing) running laterally to it or running perpendicularly thereto.

The underside of retaining device 28 can furthermore display a guide profile for a carriage (not shown in the drawing) for traversing cable drag device 1 that is connected to lower strand 6 of cable drag device 1.

List of Reference Numbers

1 Cable drag device
2 Member
3 Side bar
4 Lower cross-piece
5 Upper cross-piece
6 Lower strand
7 Deflection zone
8 Upper strand
9 Supporting element
10 Outer face
11 Adjusting device
12 Outer bar segment
13 Inner bar segment
14 Edge area
15 Supporting edge
16 Run-up surface
17 Edge area
18 Recess
19 Side wall
20 Side wall
21 Stop face
22 Stop face
23 Stop
24 Skid
25 Pivot pin
26 Pivot hole
27 Spring element
28 Retaining device
29 Channel
30 First area
31 Second area
32 Step
33 Moving connection
34 Channel
35 Wall areas
36 Opening
37 Fastening element

The invention claimed is:

1. Cable drag device for guiding energy lines, comprising a plurality of adjacent members connected to each other in pivoting fashion, each of said members having a width and including two opposite side bars connected to each other by at least one cross-connection, wherein said side bars each include an outer face, wherein said cable drag device forms a lower strand, a deflection zone, and an upper strand in the longitudinal direction of said strands, and said plurality of adjacent members are pivoted out of an essentially linear arrangement in said strands into an angled position relative to one another in said deflection zone, wherein said side bars of at least some of said plurality of adjacent members include one or more supporting elements that project outwards beyond said outer face of said side bars when in said essentially linear arrangement in said strands, and do not project outwards beyond said outer face of said side bars when in said angled position in said deflection zone, wherein at least some of said side bars including supporting elements are associated with immediately adjacent members, each of which includes an adjusting device wherein said adjusting device extends the one or more supporting elements of an adjacent member outward beyond said outer face of said side bar as a function of the relative position of said adjacent member.

2. Cable drag device according to claim 1, wherein said one or more supporting elements include a supporting edge, running in said longitudinal direction and facing in the direction of said pivoting, said supporting edge projecting outwards when one of said plurality of adjacent members is in said essentially linear arrangement relative to another adjacent member.

3. Cable drag device according to claim 1, wherein said side bars of two of said plurality of adjacent members overlap and include inner and outer bar segments, wherein said inner and outer bar segments form an overlapping area such that said outer bar segment on one of said plurality of adjacent members overlaps the inner bar segment of an adjacent member, and said one or more supporting elements form areas of said outer bar segments that can be laterally extended outwards, and said adjusting device is located on said outer face of said inner bar segment.

4. Cable drag device according to claim 3, wherein said adjusting device is designed as an outward-facing projection, wherein said one or more supporting elements, comprise an area of said outer bar segment, and said outward-facing projection on said inner bar segment is arranged in such a way that, when said plurality of adjacent members are pivoted into said essentially linear arrangement, said outward-facing projection is guided under said one or more supporting elements, extending said one or more supporting elements, outwards.

5. Cable drag device according to claim 3, wherein said one or more supporting elements is designed as an outwardly bendable area of said outer bar segment.

6. Cable drag device according to claim 4, wherein said outward-facing projection displays a run-up surface for said one or more supporting elements.

7. Cable drag device according to claim 5, wherein said one or more supporting elements has a first and a second end and includes a strip-like edge area of said outer bar segment connected to a remaining area of said outer bar segment at said first end, a slit separating said strip-like edge area and said remaining area , and said supporting edge at said second end.

8. Cable drag device according to claim 7, wherein said strip-like edge area forming said one or more supporting elements and said remaining edge area of said outer bar segment is curved in the manner of a reference circle in said longitudinal direction of said strands.

9. Cable drag device according to claim 8, wherein said second end of said strip-like edge area forming said supporting edge lies at the center longitudinal axis of the side bar.

10. Cable drag device according to claim 8, wherein said first end of said strip-like edge area that is connected to said remaining area of said outer bar segment is located in the radius of said reference circle running perpendicularly to said center longitudinal axis of said side bars.

11. Cable drag device according to claim 8, wherein said outward-facing projection is designed as a strip that is curved in the manner of a reference circle and said run-up surface rises towards said center longitudinal axis of said side bars.

12. Cable drag device according to claim 7, wherein said outer bar segment includes a second edge area located below said supporting edge of said strip-like edge area and includes an inner face and a recess on said inner face and said recess open towards said supporting edge, said recess including a side wall, wherein said side wall faces away from said supporting edge and forms a stop face for said outward-facing projection to limit the pivoting of said plurality of adjacent members in said deflection zone.

13. Cable drag device according to claim 3, wherein said inner bar segments include stop faces, inner face of the and said outer bar segments include stops and said stop faces interact with said stops to limit the pivoting of adjacent members.

14. Cable drag device according to claim 1, wherein said plurality of adjacent members include cranked side bars wherein inner bar segments are cranked inwardly and outer bar segments are cranked outwardly, and said one or more supporting elements are located on said outwardly cranked bar segments, and said adjusting device is located on said inwardly cranked bar segments.

15. Cable drag device according to claim 1, wherein said plurality of adjacent members include outer bar segments and inner bar segments, and said one or more supporting elements are located on said outer bar segments and said adjusting device is located on said inner bar segments.

16. System comprising a cable drag device accordlaim 1 and a retaining device for receiving said upper strand of said cable drag device, wherein said retaining device includes a first channel extending in said longitudinal direction of said strands, said retaining device having a first area whose width substantially corresponds to said width of said plurality of adjacent members in said deflection zone, and a second area located above said first area that is wider in stepped fashion substantially corresponds in width to said width of-said plurality of adjacent members in said strands, such that said one or more supporting elements are supported on said step of said second area on both side bars of said plurality of adjacent members.

17. System according to claim 16, wherein said retaining device also receives said lower strand in a second channel that extends in longitudinal direction of said strands and includes inward-facing wall areas, on which said plurality of adjacent members of said lower strand are supported and has a width substantially corresponding to said width of said plurality of adjacent members in said strands.

18. System according to claim 17, wherein said retaining device is designed as a trough, into which said first channel for said upper strand and said second channel for said lower strand are integrated, wherein said first area of said first channel extends to said second channel, and said second channel includes said second area and said second area is wider in stepped fashion compared to said first area.

19. System according to claim 18, wherein said retaining device is designed as a one-piece section.

20. System according to claim 18, wherein said retaining device includes an upper and lower narrow face and said upper or lower narrow face includes either an opening extending in said longitudinal direction or a fastening element, and said cable drag device includes a moving connection including a catch which passes through said opening and said moving connection is connected either to said lower strand that can be moved back and forth along said opening, or to said upper strand that can be moved back and forth along said opening.

21. System according to claim 20, wherein said fastening element is located on said narrow face opposite the narrow face including said opening by means of which said retaining device can be fastened to a surface running laterally and/or a surface running perpendicularly thereto.

22. System according to claim 16, wherein said second area of said first channel has a width which substantially corresponds to said width of said plurality of adjacent members in said strands.

23. System according to claim 17, wherein said second has a width which substantially corresponds to said width of said plurality of adjacent members in said strands.

* * * * *

UNITED STATES PATENT AND TRADEMARK OFFICE
CERTIFICATE OF CORRECTION

PATENT NO. : 7,849,667 B2
APPLICATION NO. : 11/911273
DATED : December 14, 2010
INVENTOR(S) : Thilo-Alexander Jaeker et al.

Page 1 of 1

It is certified that error appears in the above-identified patent and that said Letters Patent is hereby corrected as shown below:

On first page, in field (74), in "Attorney, Agent, or Firm", in column 2, line 1, delete "Perrealt" and insert -- Perreault --, therefor.

In column 9, line 63, in claim 7, delete "area ," and insert -- area, --, therefor.

In column 10, line 26, in claim 13, after "faces," delete "inner face of the".

In column 10, line 43, in claim 16, delete "accordlaim" and insert -- according to claim --, therefor.

In column 10, line 51, in claim 16, delete "of-said" and insert -- of said --, therefor.

In column 12, line 10, in Claim 23, after "second" insert -- channel --.

Signed and Sealed this
Tenth Day of May, 2011

David J. Kappos
*Director of the United States Patent and Trademark Office*